United States Patent
Laurent et al.

(10) Patent No.: US 10,925,703 B2
(45) Date of Patent: Feb. 23, 2021

(54) SIMULTANEOUS CLEANING OF MULTIPLE TEETH

(71) Applicant: Willo 32 SAS, Limoges (FR)

(72) Inventors: Alexandre Laurent, Brooklyn, NY (US); Jean-Marie de Gentile, Paris (FR)

(73) Assignee: Willo 32 SAS, Limoges (FR)

( * ) Notice: Subject to any disclaimer, the term of this patent is extended or adjusted under 35 U.S.C. 154(b) by 101 days.

(21) Appl. No.: 15/881,636

(22) Filed: Jan. 26, 2018

(65) Prior Publication Data

US 2019/0231499 A1  Aug. 1, 2019

(51) Int. Cl.

| | |
|---|---|
| *A61C 17/22* | (2006.01) |
| *A46B 9/04* | (2006.01) |
| *B08B 3/04* | (2006.01) |
| *B08B 5/00* | (2006.01) |
| *G06F 3/041* | (2006.01) |
| *A61C 17/02* | (2006.01) |
| *A46D 1/00* | (2006.01) |

(52) U.S. Cl.
CPC ............ *A61C 17/228* (2013.01); *A46B 9/045* (2013.01); *A61C 17/0211* (2013.01); *A61C 17/221* (2013.01); *B08B 3/04* (2013.01); *B08B 5/00* (2013.01); *G06F 3/041* (2013.01); *A46B 2200/1066* (2013.01); *A46D 1/0276* (2013.01)

(58) Field of Classification Search
CPC ............ A61C 17/0211; A61C 17/0208; A61C 17/021; A61C 17/0217; A61C 17/228; A46B 9/045
See application file for complete search history.

(56) References Cited

U.S. PATENT DOCUMENTS

| | | | |
|---|---|---|---|
| 3,401,690 A | 9/1968 | Martin | |
| 3,731,675 A * | 5/1973 | Kelly | A61C 17/0211 601/164 |
| 4,164,940 A * | 8/1979 | Quinby | A61H 13/00 433/216 |

(Continued)

FOREIGN PATENT DOCUMENTS

| | | |
|---|---|---|
| DE | 10153245 A1 | 5/2003 |
| DE | 10230736 A1 | 1/2004 |

(Continued)

*Primary Examiner* — Ralph A Lewis
(74) *Attorney, Agent, or Firm* — Daylight Law, P.C.

(57) ABSTRACT

A method and an apparatus are disclosed for simultaneously cleaning multiple teeth, such as one or both dental arches. The Dental Cleaning Apparatus (DCA) includes a cleaning engine enclosed in a main housing, a fluid tube, and a mouthpiece. The cleaning engine includes a fluid circuit having a number of pumps and solenoid valves, and a programmable controller to control the solenoid valves and other operations. The fluid tube includes a number of separate tubes for injection and evacuation of cleaning fluid from the interior of mouthpiece. The mouthpiece is generally made from a flexible and supple material, such as silicone, and may have bristles of various shapes. The cleaning engine alternates the mouthpiece between a relaxation state and a contraction state to effectively scrub the surface of all enclosed teeth simultaneously. It may automatically learn and adjust the vacuum pressure needed for each user to optimize cleaning.

20 Claims, 7 Drawing Sheets

(56) References Cited

U.S. PATENT DOCUMENTS

| | | | |
|---|---|---|---|
| 4,560,351 A | 12/1985 | Osborne | |
| 5,104,315 A * | 4/1992 | McKinley | A61C 17/0211 433/216 |
| 5,443,386 A | 8/1995 | Viskup | |
| 6,893,259 B1 * | 5/2005 | Reizenson | A61C 17/0211 433/29 |
| 7,537,451 B1 | 5/2009 | Ramnarine | |
| 9,504,542 B2 * | 11/2016 | De Gentile | A61C 17/0211 |
| 9,539,075 B2 * | 1/2017 | Sanders | A61C 19/066 |
| 9,907,633 B2 * | 3/2018 | Wolpo | A61N 1/0428 |
| 2010/0151407 A1 | 6/2010 | Rizoiu et al. | |
| 2011/0027746 A1 * | 2/2011 | McDonough | A61C 17/0211 433/80 |

FOREIGN PATENT DOCUMENTS

| | | |
|---|---|---|
| EP | 1506746 A1 | 2/2005 |
| EP | 2819614 B1 | 7/2018 |
| WO | 2005094719 A1 | 10/2005 |
| WO | 2010024798 A1 | 3/2010 |
| WO | 2013128141 A1 | 9/2013 |

\* cited by examiner

SIMULTANEOUS CLEANING OF MULTIPLE TEETH

CROSS-REFERENCE(S) TO RELATED APPLICATION(S)

This application is related to the U.S. Pat. No. 9,504,542, issued on 29 Nov. 2016, to at least one of the present applicants, the disclosure of which is hereby expressly incorporated by reference in its entirety.

TECHNICAL FIELD

This application relates generally to dental care. More specifically, this application relates to a method and apparatus for cleaning multiple teeth or all teeth simultaneously.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
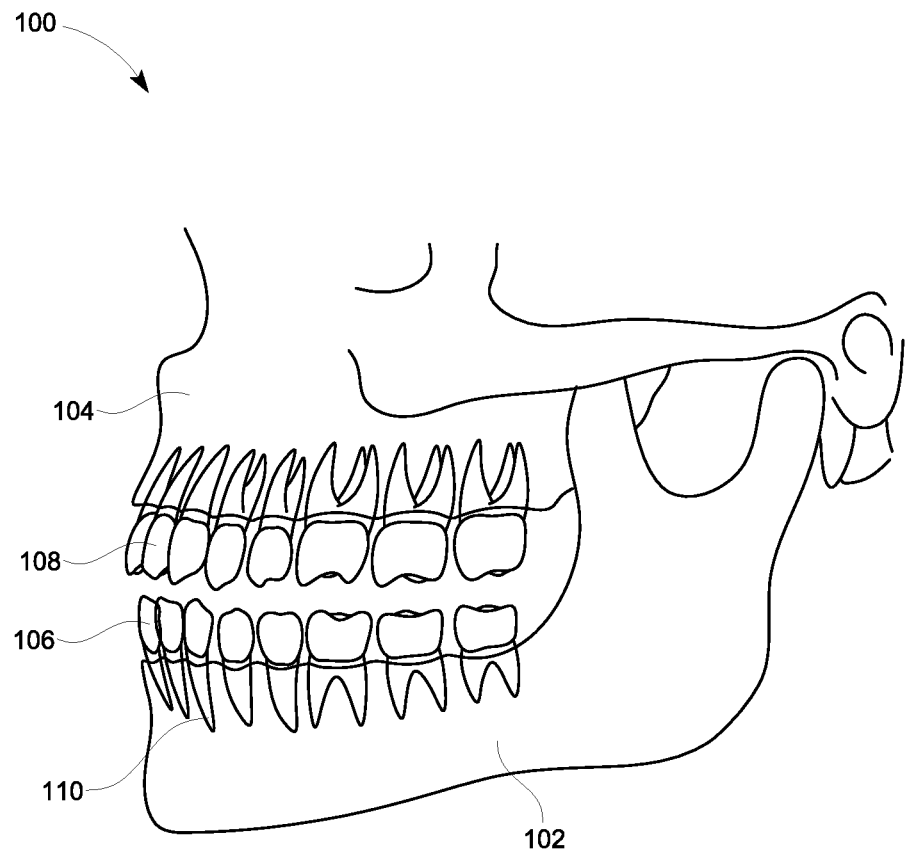
FIG. 1 is an example diagram of a human jaw and teeth.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using a mouthpiece in the human oral cavity, it will be appreciated that the disclosure may support use of a similar apparatus adapted to be used on dentures outside the mouth and in animal mouths.

Briefly described, a method and an apparatus are disclosed for simultaneously cleaning multiple teeth, such as one or both dental arches in the mouth. The Dental Cleaning Apparatus (DCA) includes a cleaning engine enclosed in a main housing, a fluid tube, a handle, and a mouthpiece. The cleaning engine includes a fluid circuit having a number of pumps and solenoid valves, a programmable controller to control the solenoid valves and other operations, a tooth cleaning fluid, a waste container, and a user interface panel to provide user control and status information. The fluid tube includes a number of separate tubes for injection and evacuation of cleaning fluid from the interior of the mouthpiece. The fluid tube couples with a handle having channels corresponding to the fluid tube to guide the fluid to the mouthpiece. The mouthpiece is generally made from a flexible and supple material, such as silicone, suitable for medical use. In some embodiments, the mouthpiece may have bristles of various shapes, such as conical, cylindrical, or irregular, to better clean the surface of the teeth. The cleaning engine alternates the mouthpiece between a relaxation state and a contraction state to effectively scrub the surface of all enclosed teeth simultaneously. It may automatically learn and adjust the vacuum pressure needed for each user to optimize cleaning. It may also automatically adjust the cleaning cycles according to various algorithms to increase cleaning effectiveness.

Unlike sharks, humans only have one set of adult teeth for all their lives. Hence, good dental and oral hygiene is of utmost importance. Besides the obvious reasons for this, such as eating and esthetics, poor oral health provides a breeding ground for bacteria and weakens overall health.

Oral hygiene tools and methods have advanced significantly in recent years, including introduction of vibrating or rotating toothbrushes. Even though these tools are a big improvement over manual brushes, they still have significant shortcomings. They take a relatively long time (most vibrating toothbrushes have a cycle of two minutes) for what they do. They can also be less than effective, especially if not used properly. For example, children, infirm elderly, and the handicap may find it difficult to use these tools properly. They also do not effectively clean between the teeth.

Hence, there is a need for a teeth cleaning system to improve upon or eliminate these shortcomings.

FIG. 1 is an example diagram of a human jaw and teeth. The human oral cavity 100 is formed chiefly by the lower maxilla 102 (mandible) and the upper maxilla 104. The lower and upper teeth have crowns 106 and 108, respectively and roots 110 arranged in two upper and lower oral arches, approximate semi-circles starting from one side of the jaw and extending in a curve to the other side, as is common knowledge.

Figure 2A:
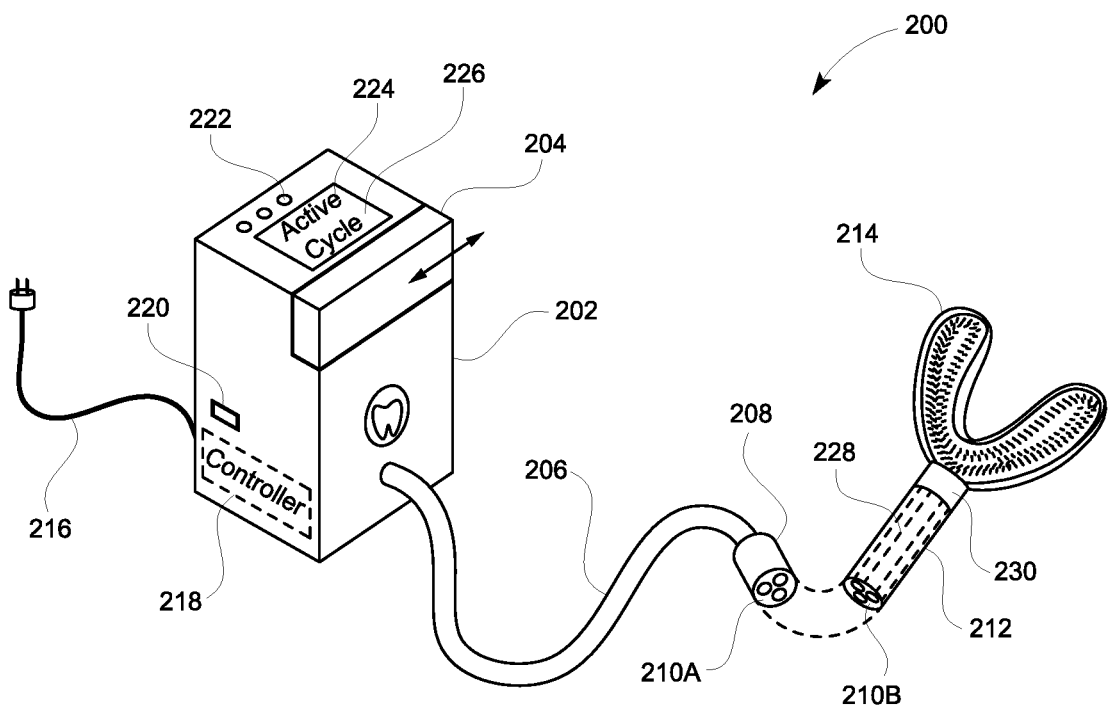
FIG. 2A shows an example apparatus for simultaneously cleaning multiple teeth.

FIG. 2A shows an example apparatus for simultaneously cleaning multiple teeth. In some embodiments, the Dental Cleaning Apparatus (DCA) 200 includes a main housing 202 enclosing a cleaning engine composed of various components, described below with respect to FIGS. 2B-4. In various embodiments, the DCA may further include a user interface with various status lights and control buttons 222, and display 224 for displaying messages 226 to the user. One or more removable compartments 204 may be used to add cleaning fluids and collect waste water. In some embodiments, the cleaning liquid or fluid may be supplied in a cartridge inserted into a special port or receptacle deployed within housing 202. A power cord 216 may be used to power the DCA. An electronic programmable controller 218 may be accessed via an external port 220 to update software programs or extract data. In some embodiments, the DCA may further include a fluid transport tube 206 having multiple tubes within to deliver or extract fluid via a coupling head 208 and interface 210a to a corresponding interface 210b on a handle 212 coupled with interface 230 of mouthpiece 214 via channels 228.

In various embodiments, the cleaning engine enclosed by main housing 202 may be powered by AC (Alternating Current) power or DC (Direct Current) power, such as batteries. The electrical power so supplied may be used to drive pumps and open or close solenoid valves to pressurize and direct cleaning fluid to the mouthpiece 214 to scrub the teeth and collect waste fluid back from the mouthpiece. The cleaning engine may further include one or more pressure sensors deployed at various points in the fluid circuit, further described with respect to FIG. 3 below, to measure real-time pressure during cleaning cycle and adjust the pressure and cleaning cycle timing in real-time accordingly. In various embodiments, the DCA may be used by more than one person by changing the handle at the fluid coupling head 208, as further described below. In some embodiments, the complete cleaning cycle is on the order of a few seconds, such as 10-30 seconds. In other embodiments, the length of the cycle may be longer or shorter and may also be user-settable or selectable, in case of pre-defined cycle durations.

In various embodiments, one or more removable containers 204 may be used to supply cleaning fluid, such as liquid or soft gel toothpaste. For example, each user may favor or need a different type of toothpaste. The removable compartment may address this need. Another removable container may be included in the housing 202 to collect waste fluid after cleaning to be disposed, as further described with respect to FIG. 3 below.

With continued reference to FIG. 2A, in various embodiments, the user interface includes indicator lights and buttons 222, and display 224 to obtain status information from the DCA and also set various configurations. For example, the indicator lights may be used to indicate "Power ON", "Active Cycle", "Finishing", or other such status information. The control buttons may be used to issue user commands to the DCA to use different configurations or routines. For example, one button can select between gentle cleaning and vigorous cleaning. Another button may indicate Reset to restart the cycle, and the like. Those skilled in the art will appreciate that the status lights and command buttons may be used in many different ways for many different status information and commands without departing from the spirit of the present disclosures. For example, lights may indicate a Short Cycle or a Long Cycle, and buttons, dials, or sliders may be used to command the same or set the cycle time to a custom duration. In some embodiments, all lights, buttons and dials may be replaced with a more comprehensive touch-sensitive display panel 224 to take user input and also display status, configuration, and operational information.

In various embodiments, the controller 218 may be a programmable controller, further described below with respect to FIG. 2B, that directs the operation of the DCA. In other embodiments, the controller may be hardwired with simple and fixed functions, not configurable by the user. In still other embodiments, the controller may be locked to prevent configuration. Such embodiments may be useful to avoid user confusion or misconfiguration, for example, when the users are small children or infirm adults.

In various embodiments, the fluid transport tube 206 may be made of flexible material, such as various medical grade plastics or silicone, to couple the cleaning engine with the handle 212 and mouthpiece 214 to deliver cleaning services to the teeth. The coupling head 208 may be pressure-fit over or within the handle 212 to line up the fluid interface 210a with handle interface 210b. In some embodiments, the fluid interface may include at least one output from the cleaning engine to the mouthpiece to deliver cleaning fluid and at least one input from the mouthpiece back to the cleaning engine to collect waste fluid. In other embodiments in which the mouthpiece covers a single arch of teeth, two output fluid ports (from cleaning engine to mouthpiece) and one input fluid port (from mouthpiece to cleaning engine) may be deployed. Each of the two output ports goes to one branch of the mouthpiece to deliver cleaning fluid, and one common input for collecting waste fluid from both branches, as further described below with respect to FIGS. 3 and 4.

With continued reference to FIG. 2A, in various embodiments, the handle 212 may be color-coded so different individual users can easily identify and couple their personal handle attached to their personal mouthpiece with the cleaning engine. In various embodiments, the handle has two ends, each with a fluid interface. One end of the handle couples and interfaces with the fluid transport tube 206 coupling head 208, and the other end has a similar fluid interface 230 that couples with the mouthpiece 214 via internal handle channels 228, as further described below with respect to FIGS. 3 and 4. In some embodiments, the mouthpiece side of the fluid interface of the handle may have a different geometric arrangement than the side on the coupling head 208. For example, the mouthpiece side may have more or fewer fluid ports to receive cleaning fluid than provided by the coupling head 208. The internal configuration of the handle determines how the fluid is delivered to or extracted from the mouthpiece. For example, if the mouthpiece has four ports to receive cleaning fluid while the coupling head 208 has two ports, then the handle internally splits the channels (pathways leading from fluid entry to exit of ports within the body of the handle) leading from the two ports of the coupling head into four ports for delivery to the mouthpiece. In other embodiments, the fluid transport tube may be connected directly to the mouthpiece 214 without a handle.

Figure 6:
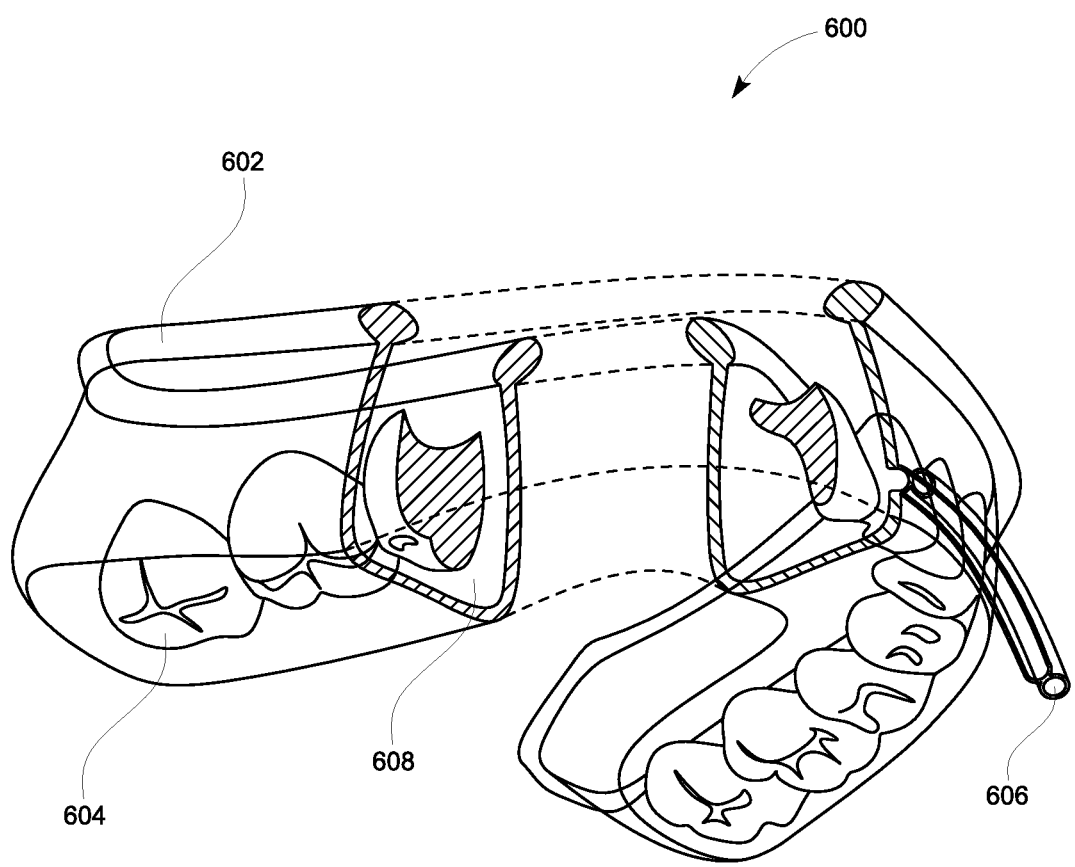
FIG. 6 shows the example mouthpiece of FIG. 4 as applied to an upper dental arch.
Figure 7A:
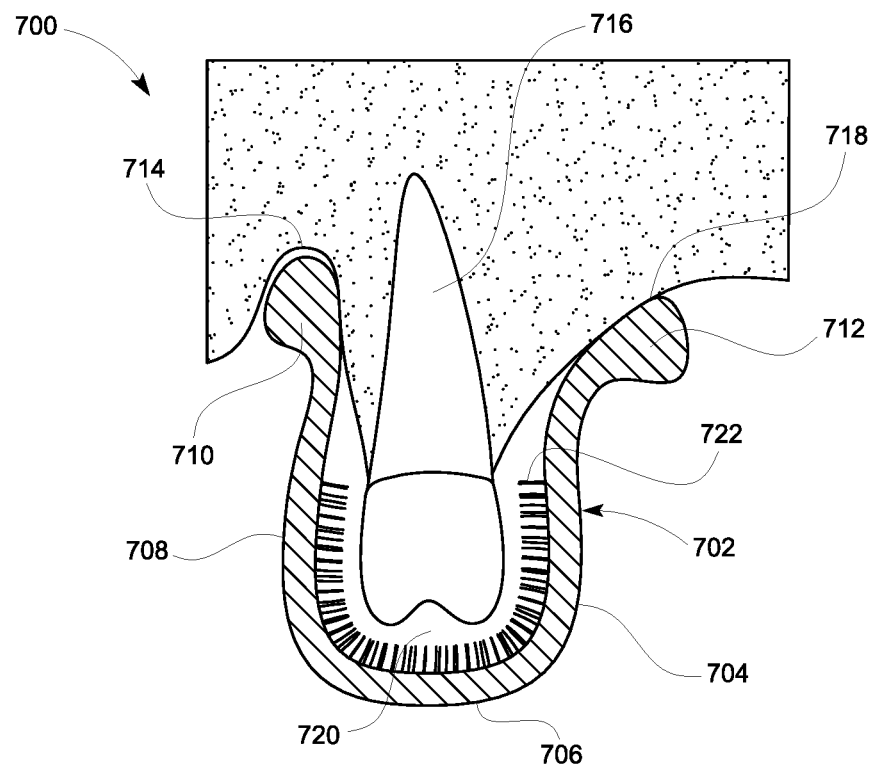
FIG. 7A shows an example of the mouthpiece of FIG. 4 enclosing a tooth in a relaxation state.
Figure 7B:
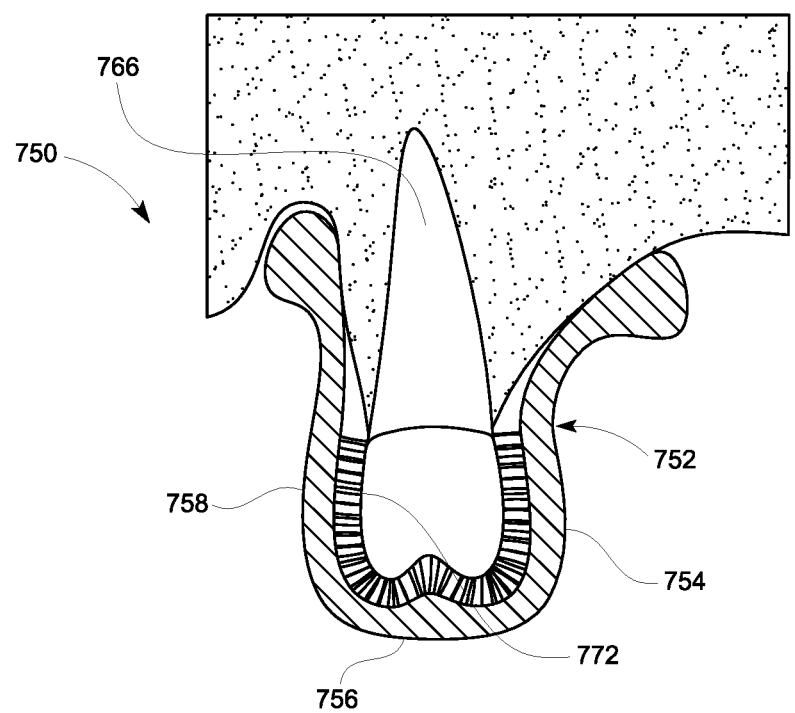
FIG. 7B shows an example of the mouthpiece of FIG. 4 enclosing a tooth in a contraction state.

In various embodiments, the mouthpiece 214 is made of medical-grade flexible and supple material like silicone and covers or encloses one oral arch or two (upper and lower arches), as further described with respect to FIGS. 6-7B. For each type of mouthpiece, the delivery ports and channels (pathways leading from fluid entry to exit ports within the body of the mouthpiece) are split to distribute the cleaning fluid. This way, the handle interface on the mouthpiece side can be used with multiple types of mouthpieces, so the same handle can be used with different types of mouthpieces. In various embodiments, the mouthpiece 214 for use with one oral arch is covered with a large number of bristles, measured in hundreds or thousands, such as 2000 to 4000, to increase cleaning surface and angles for more effective scrubbing and cleaning of teeth surfaces and between the teeth. The bristles may have various profile shapes such as conical, tapered bars, cylindrical, or irregular, or a combination of some or all of these shapes. The teeth-facing and/or the bristles of the mouthpiece may further be dip-coated with additional fine abrasive material to increase cleaning and scrubbing effectiveness of the teeth surfaces. The fine abrasive material so coating the mouthpiece may be of a hardness that is greater than tartar or other sediments and deposits on teeth surfaces, but less than enamel hardness to clean but avoid harming the teeth.

Figure 2B:
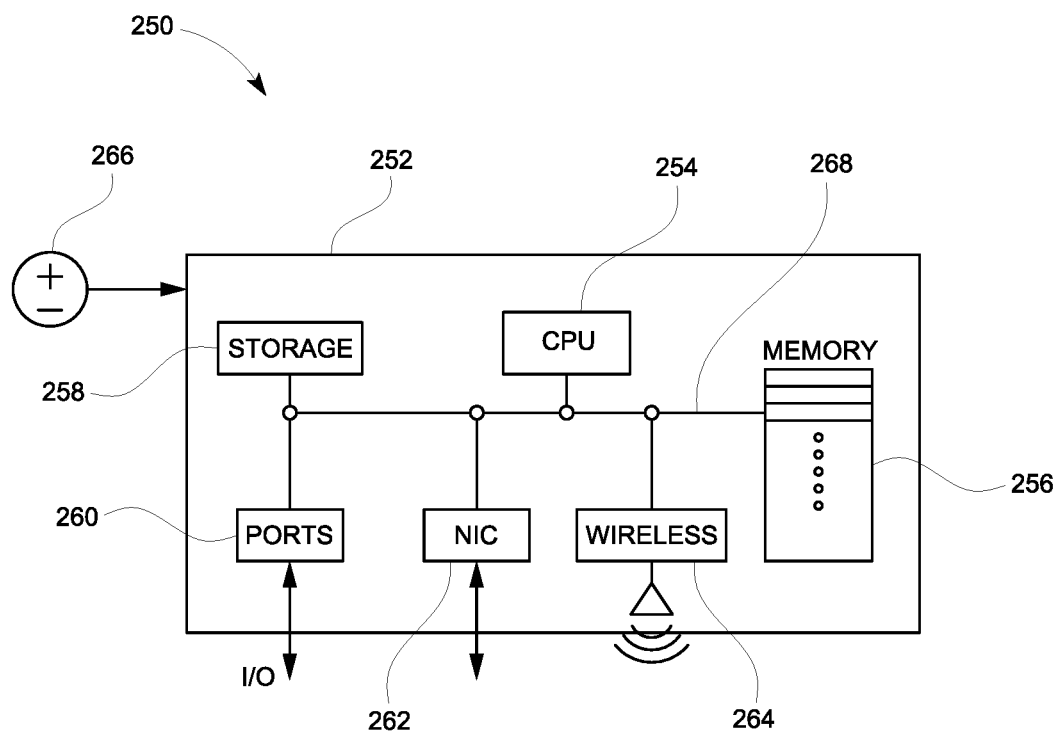
FIG. 2B shows an example electronic controller for executing software to control the operation of the apparatus of FIG. 2A.

FIG. 2B shows an example electronic controller for executing software to control the operation of the apparatus of FIG. 2A. In various embodiments, the controller 250 includes baseboard 252 having a CPU (Central Processing Unit) 254, computer memory 256, data storage 258, Input/Output (I/O) ports 260, Network Interface Card (NIC) 262, wireless communication interface 264, all connected with computer data and control bus 268. Power supply 266 supplies electrical power to the controller.

In various embodiment, the controller 250 is a simple programmable computer that can load and execute software, receive sensed data, control display and output other control signals.

In various embodiments, the CPU 254 is connected to the computer bus 268 via which it has access to and control over other components of the controller. The memory unit 256 may store both executable program and data during various computations, such as determining pressure values or which valves to open and close. The storage 258 may be a non-volatile memory, such as ROM (Read Only Memory) or solid-state disk drive used to permanently store programs or configuration data. I/O ports 260 may be used by the CPU to receive and transmit electronic signals to other devices. For example, the CPU may read pressure data from pressure sensors or user input and it may also send out signals to open or close a valve or to start or stop a pump. The NIC and wireless interfaces may be used to download or upload new software programs and data by wire, such as using USB (Universal Serial Bus) or Ethernet, or wirelessly, such as using Bluetooth or WiFi protocols. Using this feature, new functions, improved performance, and higher quality may be achieved. A dentist may also be able to use data from the DCA as part of his patients' treatment and maintenance programs.

Figure 3:
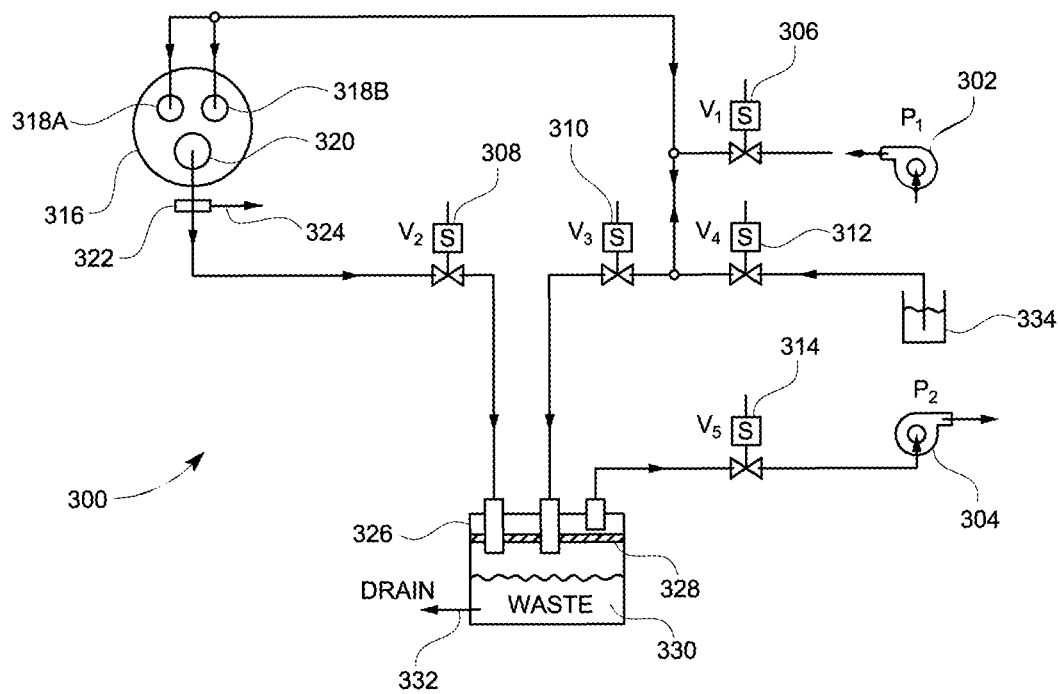
FIG. 3 shows an example diagram of a fluid circuit of the apparatus of FIG. 2A.

FIG. 3 shows an example diagram of a fluid circuit of the apparatus of FIG. 2A. In various embodiments, the fluid circuit 300 includes pumps 302 and 304 coupled with solenoid valves 306, 308, 310, 312, and 314, cleaning fluid cartridge or container 334, mouthpiece 316 having ports 318a, 318b, and 320, sensor 322 with output signal 324, waste fluid container 326 with separator 328 for holding waste fluid 330 disposed through drain opening 332.

In various embodiments, the fluid circuit 300 performs repeated cleaning cycles to clean the teeth at the rate of about 10-20 cycles per second. In some embodiments, the frequency of the cleaning cycles may be more or less than this range. Each cleaning cycle includes four distinct and successive phases: cleaning fluid or liquid injection, creation of vacuum, air injection, and draining, as further described below. In various embodiments, the pumps and the solenoid valves are computer-controlled devices and are operated by the controller 218 (FIG. 2A) via electronic signals transmitted to control interfaces of these devices. In various embodiments, the mouthpiece encloses at least one dental arch and creates a substantially sealed enclosure around the teeth suitable to create a low-pressure vacuum, on the order of 4-8 PSI (Pounds per Square Inch), inside the sealed enclosure. The sealed enclosure boundaries include the walls of the mouth piece. In various embodiments, stronger or weaker vacuum pressures may be created.

In various embodiments, the pumps 302 and 304, as well as solenoid valves 306-314 are controlled by controller 250 (FIG. 2B) to move and direct the cleaning fluid and waste fluid through different paths in the fluid circuit, under software control. In the first phase, the fluid injection phase of the cleaning cycle, pump 304 is turned ON, valves 308, 312, and 314 are opened and valves 306 and 310 are closed. This circuit configuration causes the cleaning fluid from container 334 to be pulled or sucked into the mouthpiece 316 via mouthpiece input ports 318a and 318b. Solenoid valve 314 only pulls air out, not waste fluid, to pull the cleaning liquid into the mouth piece.

In various embodiments, in the second phase of the cleaning cycle, vacuum is created within the interior of the mouthpiece. This action causes the mouthpiece to be contracted and entered into a contraction state to exert pressure against the teeth and commence a micro-scrubbing action by the mouthpiece and its bristles, without overt movement as observed in manual or motorized brushing. By virtue of contraction, the bristles contact the teeth surface and start bending under vacuum pressure. The bending or other deformation of the bristles and/or mouthpiece body creates a small motion that rubs the mouthpiece against the teeth, hence creating micro-scrubbing. The length of scrubbing stroke is on the order of the length of the bristles and/or reduction in dimensions of the mouthpiece body under vacuum pressure in a contraction state. This phase is performed by turning OFF pump 302, turning ON pump 304, closing valves 306, 312, and 310 and opening valves 308 and 314 to create a path from mouthpiece output port 320 to pump 304. The suction creates vacuum in the interior of the mouthpiece because the interior of the mouthpiece is now air-tight and the only way out is through the path created which evacuates air and compresses the mouthpiece and its bristles.

In various embodiments, in the third phase of the cleaning cycle, air is injected to transition the mouthpiece to a relaxation state, removing pressure from teeth surfaces. More micro-scrubbing takes place as the bristles and mouthpiece body recover their unstressed shapes and move back. During this phase, the controller turns ON pump 302 and 304, open valves 306, 308, and 314, and close valves 310 and 312 to break the vacuum and fill the interior of the mouthpiece with normal amounts of air and causing the mouthpiece to regain its unstressed shape.

In various embodiments, in the fourth phase of the cleaning cycle, the collected waste fluid is disposed. In this phase, first, pump 302 is turned ON in addition to opening solenoid valves 306 and 310, while other valves are closed to push waste water out of the drain 332. Next, pump 302 is turned OFF and valves 306 and 310 are closed and pump 304 is turned ON and valves 308 and 314 are opened to clean out the mouthpiece from any waste fluid. Pump 304 always pulls only air and no fluid goes through it because all waste fluid is precipitated in the waste container 326.

In various embodiments, one or more pressure sensors may be deployed within the fluid circuit and/or within the mouthpiece to collect and transmit pressure data to the controller 250. For example, sensor 322 may be placed at the output port 320 of the mouthpiece to measure vacuum pressure within the mouthpiece and transmit the pressure data to the CPU to calculate optimal vacuum pressure exerted via pump 304 for best cleaning results.

In various embodiments, in operation, the cleaning engine repeatedly goes through the above successive cleaning phases at a rate of approximately 10-20 cycles per second. The amount of scrubbing the teeth experience in a few seconds exceeds the amount of brushing performed in several minutes by existing brushing methods.

Those skilled in the art will appreciate that the pumps and solenoid valves may be turned ON and OFF (or opened and closed) in various combinations to direct fluid motion and exert different pressure levels and for different time durations, under software control, to effect different operations of the DCA for creating different cleaning cycles and/or performing various functions. For example, the pressure sensors 322 may provide data used by the DCA software to detect the positioning of the mouthpiece in the mouth and start the cleaning cycles automatically without user input. Another example is the optimization of cleaning cycle, as further described below with respect to FIGS. 8A and 8B.

Figure 4:
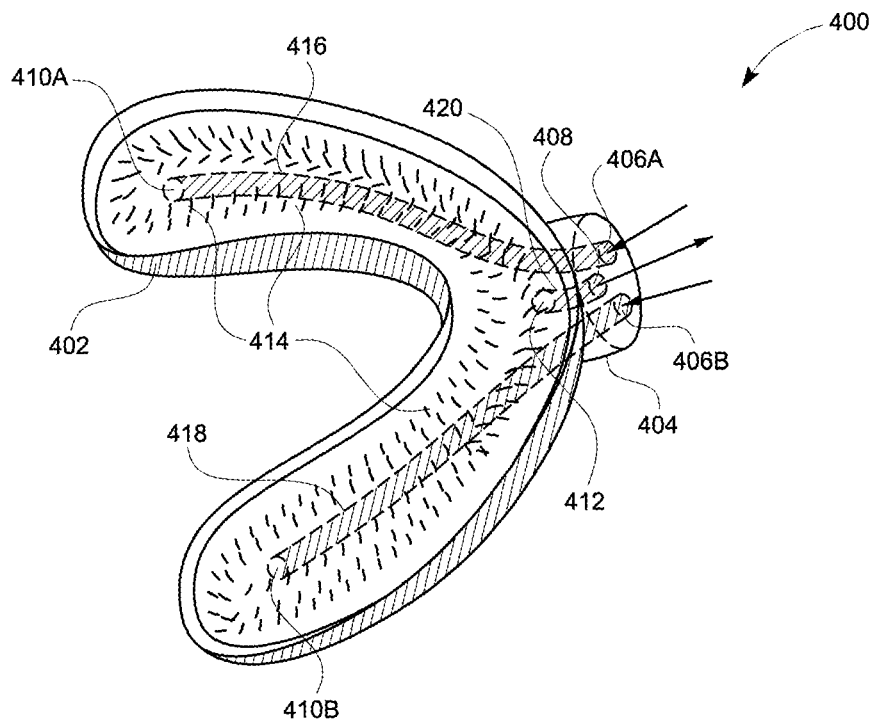
FIG. 4 shows an example mouthpiece with fluid ports usable as a component of the apparatus of FIG. 2A.

FIG. 4 shows an example mouthpiece with fluid ports usable as a component of the apparatus of FIG. 2A. In various embodiments, mouthpiece 400 includes a body 402, a base 404, fluid interface with input ports 406a and 406b, and output port 408 extending into internal mouthpiece channels 416, 418, and 420, respectively, and leading to internal mouthpiece ports 410a, 410b, and 412, respectively. In some embodiments, the inner side of the mouthpiece 400 enclosing and facing the teeth, may be covered with bristles to provide extra scrubbing function.

In various embodiments, the mouthpiece body 402 may be constructed from flexible and supple material like silicone that is usable for medical applications. A double-arch mouthpiece may be used with DCA that may be configured as two back to back single-arch mouthpieces to cover both the upper and the lower dental arches. Various types and sizes of mouthpieces with various colors, firmness, and abrasive characteristics may be used by different or same users. For each type of mouthpiece, the mouthpiece fluid ports 406a, 406b, and 408 may be standardized in terms of size, location, dimensions, coupling method and other coupling characteristics to fit the corresponding mouthpiece end of the handle 212 (FIG. 2). This way, the handle interface on the mouthpiece side can be used with multiple types of mouthpieces, so the same handle can be used with different types of mouthpieces. In various embodiments, the mouthpiece 400 may be covered with a large number of bristles, on the order of many hundreds or thousands, such as 2000 to 4000 (or more or less depending on the size of the bristles and the mouthpiece), to increase cleaning surface and angles for better cleaning of teeth surfaces and between the teeth. The bristles may have various profile shapes such as conical, tapered bars, cylindrical, or irregular, or a combination of some or all of these shapes. The inner surface and/or the bristles of the mouthpiece may further be coated with fine abrasive materials, such as abrasive powders, to increase cleaning and scrubbing effectiveness of the teeth surfaces. The fine abrasive coating of the mouthpiece and/or bristles may be harder than tartar or other deposits on teeth surfaces to be cleaned, but softer than enamel to avoid harming the teeth.

In some embodiments, the mouthpiece body 402 may include more exit ports like 410a and 410b, and their corresponding channels, deployed at various points on the mouthpiece surface facing the teeth. In such configurations, the cleaning fluid may be distributed more uniformly and completely.

Figure 5A:
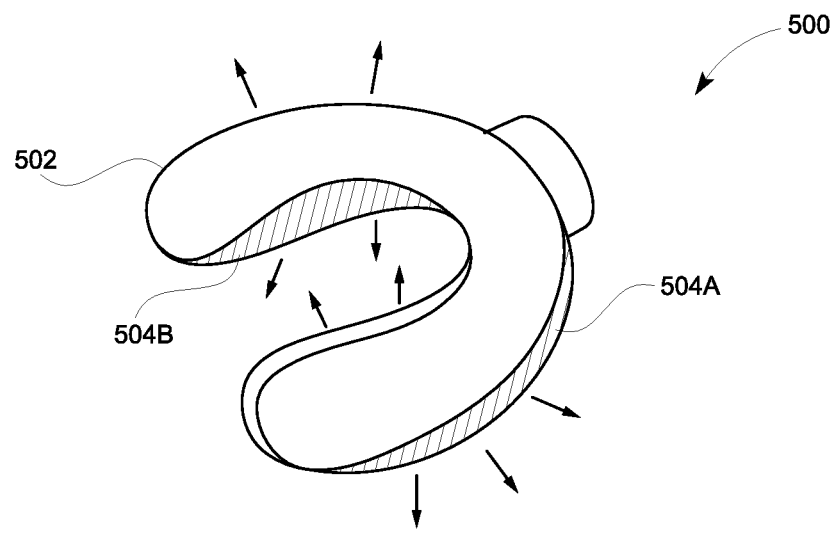
FIG. 5A shows the example mouthpiece of FIG. 4 in a relaxed non-contracted state.

FIG. 5A shows the example mouthpiece of FIG. 4 in a relaxed non-contracted state. In various embodiments, mouthpiece 500 includes a body 502, inner sidewalls 504a and outer sidewalls 504b.

In various embodiments, the mouthpiece starts out in a relaxation or non-contracted state in the operation of the DCA. In the relaxation state, the mouthpiece inner and outer sidewalls are not stressed under pressure and have their free-standing dimensions. The mouthpiece may also transition to the relaxation state from the contraction state during the cleaning cycles.

Figure 5B:
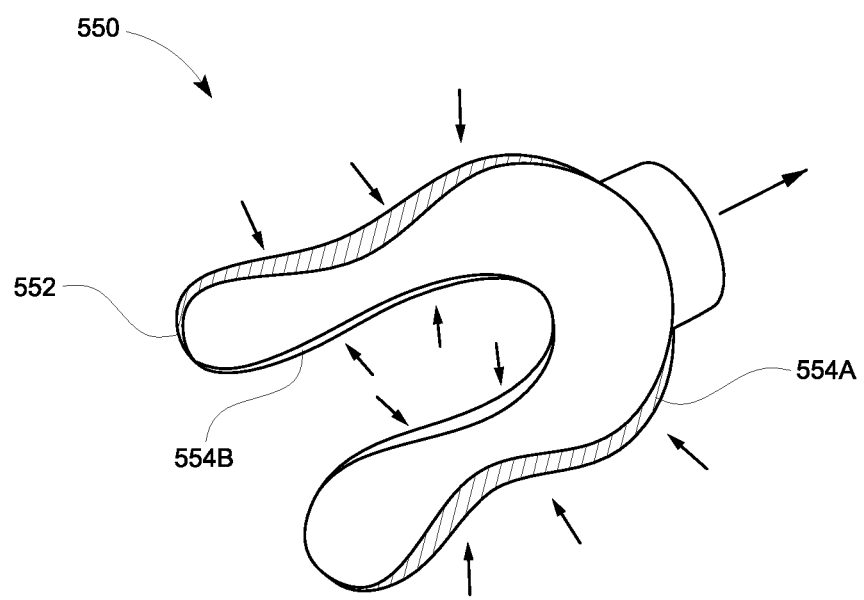
FIG. 5B shows the example mouthpiece of FIG. 5A in a contracted state.

FIG. 5B shows the example mouthpiece of FIG. 5A in a contracted state. In various embodiments, mouthpiece 550 includes a body 552, inner sidewalls 554a and outer sidewalls 554b, similar to the mouthpiece of FIG. 5A.

In various embodiments, the mouthpiece encloses at least one dental arch and creates a substantially sealed enclosure around the teeth suitable to create a low-pressure vacuum inside the sealed enclosure. In various embodiments, when vacuum is created within the sealed enclosure, the mouthpiece enters the contracted state in the operation of the DCA. Under these conditions, the mouthpiece inner and outer sidewalls are compressed under vacuum pressure and are contracted and pressed against and squeeze the teeth with compressed dimensions. The mouthpiece may also transition to the contracted state from the relaxation state during the cleaning cycles.

FIG. 6 shows the example mouthpiece of FIG. 4 as applied to an upper dental arch. In various embodiments, configuration 600 includes mouthpiece 602, enclosing and covering teeth 604, having a cross section 608, and having input ports 606.

In various embodiments, the mouth-piece 602 encloses all teeth on the upper dental arch between the mouthpiece walls and the palate (roof of mouth), creating an air-tight and water-tight space within the interior of the mouthpiece that may be vacuumed and evacuated from air under pump pressure. The sealing of the interior of the mouthpiece against air leaks is needed in the operation of the DCA to enable the vacuum creation and air injection phases.

FIG. 7A shows an example of the mouthpiece of FIG. 4 enclosing a tooth in a relaxation state. In various embodiments, mouthpiece application 700 to a tooth includes mouthpiece 702 with inner sidewall 704 (towards interior of the oral cavity), bottom wall 706, outer sidewall 708, bristles 722, outer rim 710 in contact with and conforming to shape of upper lip's interior space (gingival-jugal sulcus 714), inner rim 712 in contact with and conforming to shape of palate 718, surrounding tooth 716 with air pockets 720 between bristles and teeth.

In various embodiments, the inner rim 712 and outer rim 710 of mouthpiece 702 may have a bulged, enlarged, or thickened cross section, with a circular or oval shape as shown, to better seal the inner space of the mouthpiece enclosing the teeth against the palate 718 and gingival-jugal sulcus 714, respectively. In the relaxation state of the mouthpiece as shown, the bristles do not firmly touch the teeth and pockets of air remain between the teeth and the bristles or inner surface of the mouthpiece.

FIG. 7B shows an example of the mouthpiece of FIG. 4 enclosing a tooth in a contraction state. In various embodiments, mouthpiece application 750 to a tooth includes mouthpiece 752 with inner sidewall 754 (towards interior of the oral cavity), bottom wall 756, outer sidewall 758, bristles 772 surrounding and firmly pressed against tooth 766.

In various embodiments, the inner rim and outer rim of mouthpiece 752 may have a bulged, enlarged, or thickened cross section, as shown, to better seal the inner space of the mouthpiece enclosing the teeth against the palate and gingival-jugal sulcus, respectively. In the contraction state of the mouthpiece as shown, the bristles firmly touch and press against the teeth and no pockets of air remain between the teeth and the bristles or inner surface of the mouthpiece. The contraction state of the mouthpiece is when most of the cleaning and scrubbing of the teeth surfaces takes place.

Figure 8A:
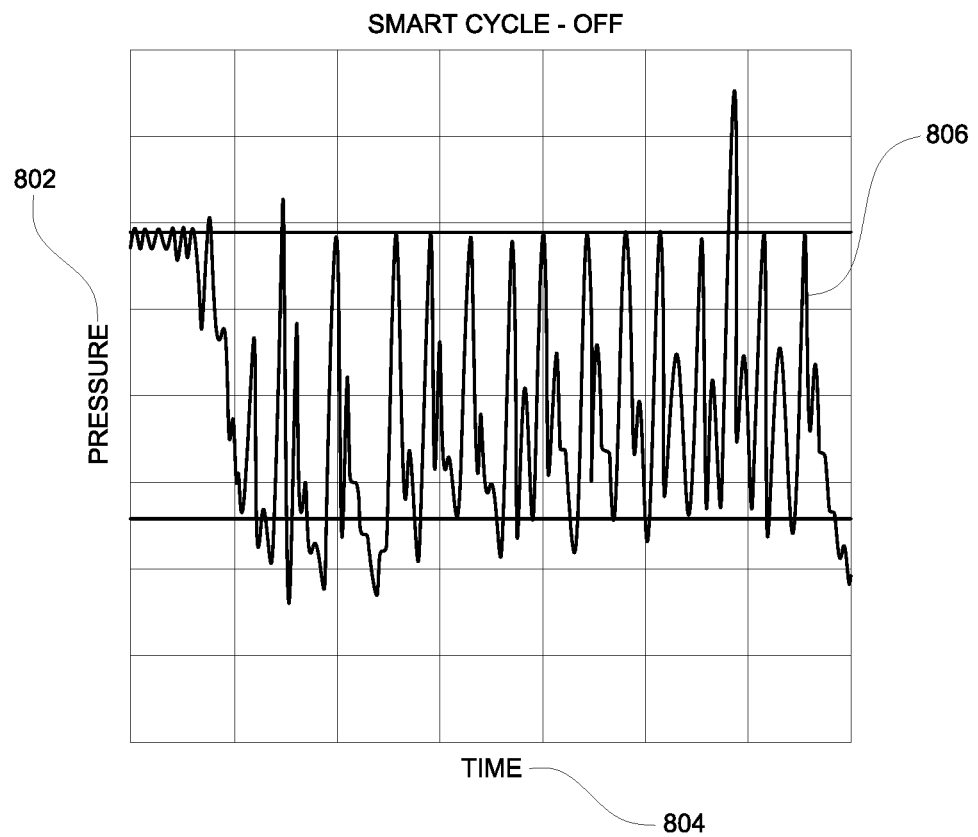
FIG. 8A shows an example mouthpiece pressure waveform without feedback control.

FIG. 8A shows an example mouthpiece pressure waveform without feedback control. In various embodiments, the data representation includes a measure of vacuum pressure 802 on the vertical axis, a measure of time 804 on the horizontal axis, and a time-based pressure curve 806 showing the behavior of the DCA with respect to pressure in absence of feedback.

In various embodiments, in the absence of a feedback signal, such as a pressure value obtained from a pressure sensor, the DCA operates as an open-loop system. Those skilled in the art will appreciate that an open-loop system operates based on its designed behavior in which the input of the system is de-coupled and unrelated directly to the output of the system. In contrast, in a feed-back system, the input is adjusted based on a feed-back signal taken from the output of the system. As an example, a tricycle is a mechanically stable and balanced system and can operate in an open loop configuration or mode without depending on a feedback signal from its output, which is the balance of the tricycle. A bicycle, in contrast, is not a stable and balanced system and unless the rider adjusts his position and weight balance based on sensing the balance of the bicycle (falling to one side or the other), the system crashes. Feedback systems are generally more precise because any deviation in output can be corrected via the feedback loop.

The pressure curve 806 operating in open-loop mode is generated DCA's cleaning cycle operation and represents the vacuum pressure within the interior of the mouthpiece. Because the shape and surface contours of the oral cavity and the teeth of every person are different, the vacuum created within the interior of the mouthpiece via the mouthpiece needs different levels of exertion by the pumps to maintain the vacuum. For example, if the rims of the mouthpiece do not fully conform to the shape of the palate to create a good seal, the pumps need to work harder to maintain the vacuum. But, in absence of pressure feedback the pumps have no way of knowing if they need to work harder. As such, the pressure within the mouthpiece may fall prematurely or faster before the vacuum phase of the cleaning cycle is complete. This is depicted in the diagram of FIG. 8A. The pressure curves rise to a peak and then almost immediately fall, creating sub-optimal pressure curves and cleaning cycles.

Figure 8B:
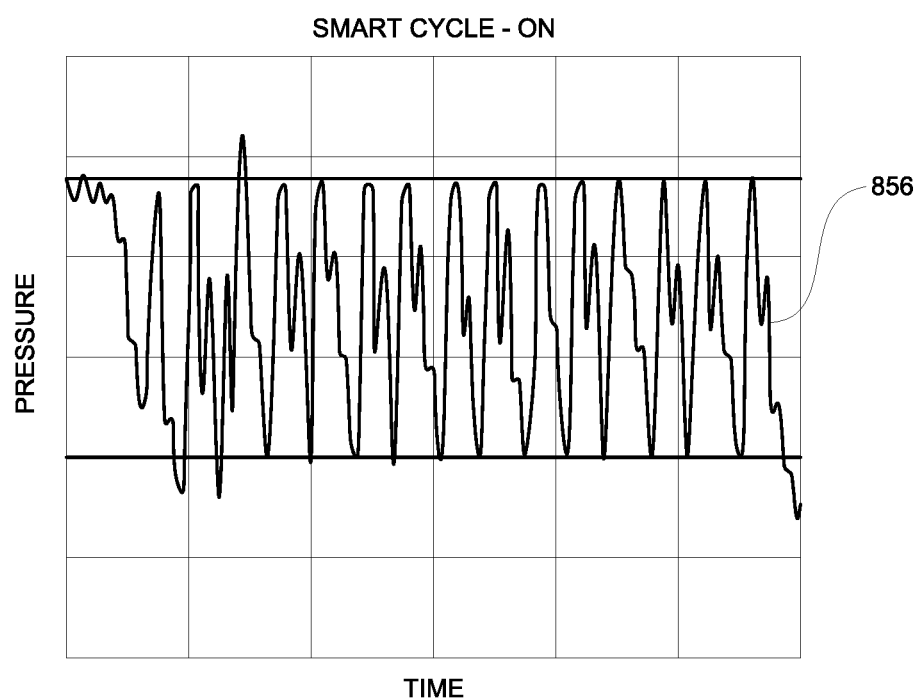
FIG. 8B shows an example mouthpiece pressure waveform with feedback control.

FIG. 8B shows an example mouthpiece pressure waveform with feedback control. In various embodiments, the data representation includes a time-based pressure curve 856 showing the behavior of the DCA with respect to pressure with feedback.

With reference to FIGS. 3 and 8B, in various embodiments, the feedback signal or signals 324 from pressure sensor 322 may be used by the programmable controller of the DCA to adjust vacuum pressure and air injection in the sealed mouthpiece. Because the operating principle of the DCA is alternating and sustained relaxation (no vacuum in the interior of mouthpiece) and contraction (vacuum in the interior of mouthpiece), an optimal cleaning cycle depends on the ability to sustain vacuum for the duration of the appropriate phases in the cleaning cycle. So, if the seal inside the interior of the mouthpiece is broken prematurely before the appropriate phase is terminated, as indicated by a pressure drop, the controller causes the pumps to continue to work or work harder to maintain the vacuum. This process results in more regular, predictable, and sustained pressure curves, as shown in FIG. 8B compared with the pressure curve shown in FIG. 8A. The more regular and better controlled pressure curves enable the DCA to perform better, since it depends on the pressure cycles to perform cleaning functions. The feedback process enables the DCA to perform near-optimally due to well-controlled pressure cycles.

In various embodiments, by detecting a good seal via the pressure signal feedback, the DCA may be able to detect when the mouthpiece is positioned properly in the user's mouth with proper seal to hold vacuum, and then start the cleaning cycle automatically without user input.

Those skilled in the art will appreciate that the pressure feedback signals may be used by the DCA to perform other auxiliary functions to improve the main function of cleaning teeth. For example, the DCA can automatically experiment with different pressure cycle durations and phase durations to find optimal cleaning cycles. The pressure signal informs the DCA about pressure conditions within the interior of the mouthpiece, which largely defines the phase of the cleaning cycle. As long as the pressure is maintained at a particular level, the phase duration of the cleaning cycle can be maintained, thus altering the overall cleaning cycle.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but it is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but it is intended to cover various arrangements included within the spirit and scope of the broadest interpretation so as to encompass all such modifications and equivalent arrangements.

What is claimed is:

1. A Dental Cleaning Apparatus (DCA) comprising:
a cleaning engine including a programmable controller, a plurality of computer-controlled pumps controlled by the programmable controller, and a plurality of computer-controlled valves coupled with the pumps and controlled by the programmable controller;
a fluid transport tube coupled with the cleaning engine;
a mouthpiece, made from a flexible and supple material, coupled with the fluid transport tube;
wherein the cleaning engine controls the plurality of computer-controlled pumps and computer-controlled valves to alternate the mouthpiece between a relaxation state and a contraction state, by injecting air and creating a vacuum, to create a scrubbing action; and
wherein the cleaning engine controls the plurality of computer-controlled pumps and computer-controlled valves to move fluid through the fluid transport tube to the mouthpiece and to drain fluid from the mouthpiece.

2. The DCA of claim 1, further comprising a touch-sensitive display for user input and status information.

3. The DCA of claim 1, further comprising a cleaning fluid container and a waste fluid container.

4. The DCA of claim 1, wherein the computer-controlled valves are solenoid valves.

5. The DCA of claim 1, wherein a first one of the plurality of computer-controlled pumps supplies air through a first one of the plurality of computer-controlled valves to the mouthpiece.

6. The DCA of claim 1, wherein a second one of the plurality of computer-controlled pumps creates a vacuum through a second one of the plurality of computer-controlled valves in an enclosure created by the mouthpiece.

7. The DCA of claim 1, wherein a first one of the plurality of computer-controlled pumps supplies forced air through a third one of the plurality of computer-controlled valves to drain waste fluid from a waste fluid collection container.

8. The DCA of claim 1, wherein a second one of the plurality of computer-controlled pumps creates suction through selected valves of the plurality of computer-controlled valves to draw cleaning fluid from a cleaning fluid container into the mouthpiece.

9. The DCA of claim 1, wherein the mouthpiece includes a plurality of bristles on an interior surface of the mouthpiece facing a dental arch enclosed by the mouthpiece.

10. A Dental Cleaning Apparatus (DCA) comprising:
a cleaning engine including a programmable controller, a plurality of computer-controlled pumps controlled by the programmable controller, and a plurality of computer-controlled valves coupled with the pumps and controlled by the programmable controller;
a fluid transport tube coupled with the cleaning engine;
a mouthpiece, made from a flexible and supple material, coupled with the fluid transport tube;
wherein the cleaning engine controls the plurality of computer-controlled pumps and computer-controlled valves to alternate the mouthpiece between a relaxation state and a contraction state, by injecting air and creating a vacuum, to create a scrubbing action;
wherein the cleaning engine controls the plurality of computer-controlled pumps and computer-controlled valves to move fluid through the fluid transport tube to the mouthpiece and to drain fluid from the mouthpiece; and
a pressure sensor coupled with the mouthpiece to measure the vacuum pressure in an interior space of the mouthpiece and provide a feedback signal to the cleaning engine.

11. The DCA of claim 10, further comprising a touch-sensitive display for user input and status information.

12. The DCA of claim 10, wherein the fluid transport tube comprises a plurality of fluid input and output ports coupled to corresponding ports on the mouthpiece.

13. The DCA of claim 10, wherein the mouthpiece comprises a plurality of bristles with a profile of tapered or random shape with a fine abrasive surface for cleaning teeth.

14. The DCA of claim 10, wherein the feedback signal is used by the cleaning engine to control at least one of the plurality of computer-controlled pumps to adjust a pressure cycle of the cleaning engine.

15. The DCA of claim 10, wherein the feedback signal is used by the cleaning engine to automatically and without user input determine a proper position of the mouthpiece and start a cleaning cycle.

16. The DCA of claim 10, wherein the cleaning engine performs a cleaning cycle having four distinct phases including fluid injection, vacuum creation, air injection, and drainage of waste fluid.

17. A method of cleaning teeth, the method comprising:
placing a mouthpiece attached to a pressure-based cleaning engine, having a plurality of computer-controlled pumps and computer-controlled valves, in a mouth to create a sealed enclosure around at least one entire dental arch;
injecting a cleaning fluid into the sealed enclosure;
creating a vacuum inside the sealed enclosure to press the mouthpiece against the dental arch;
injecting air into the sealed enclosure to eliminate the vacuum; and draining a waste fluid drawn from the sealed enclosure;
scrubbing the dental arch by repeatedly creating the vacuum inside the sealed enclosure and injecting air into the sealed enclosure to eliminate the vacuum to alternate the mouthpiece between a relaxation state and a contraction state to create a scrubbing action;

wherein the repeated creation and elimination of the vacuum is conducted via the plurality of computer-controlled pumps and computer-controlled valves;

wherein the injection of the cleaning fluid is conducted via the plurality of computer-controlled pumps and computer-controlled valves; and wherein the draining of the waste fluid is conducted via the plurality of computer-controlled pumps and computer-controlled valves.

18. The method of claim 17, wherein the injecting a cleaning fluid comprises turning ON a first pump and selected valves in a fluid circuit to draw leaning fluid into the sealed enclosure.

19. The method of claim 17, wherein the creating vacuum comprises turning ON a first pump and selected valves to remove air from the sealed enclosure.

20. The method of claim 17, wherein the injecting air comprises turning ON a second pump and selected valves to force air into the sealed enclosure.

* * * * *